United States Patent [19]

Bitzel

[11] 4,385,276
[45] May 24, 1983

[54] MOUNTING OF SEMICONDUCTOR SENSING MEANS FOR AN ELECTROMAGNETIC TACHOMETER IN A PORTABLE ELECTRIC TOOL

[75] Inventor: Michael E. Bitzel, Stevensville, Md.

[73] Assignee: Black & Decker Inc., Newark, Del.

[21] Appl. No.: 314,983

[22] Filed: Oct. 26, 1981

Related U.S. Application Data

[63] Continuation-in-part of Ser. No. 116,259, Jan. 28, 1980, abandoned.

[51] Int. Cl.³ .......................... H02K 7/14; G01P 3/48
[52] U.S. Cl. ..................................... 324/174; 310/47; 310/50; 310/68 R; 318/326
[58] Field of Search ............... 324/166, 168, 173, 174, 324/207, 208; 310/47, 50, 68 R, 59; 318/326

[56] References Cited

FOREIGN PATENT DOCUMENTS

| 2539548 | 7/1976 | Fed. Rep. of Germany | 324/174 |
| 52-54469 | 2/1977 | Japan | 324/174 |
| 54-113374 | 4/1979 | Japan | 324/174 |

OTHER PUBLICATIONS

Wehmer, "Electromagnetic Tachometer", Dec. 1968, pp. 746-747, IBM Technical Disclosure Bulletin, vol. 11, No. 7.

Primary Examiner—Gerard R. Strecker
Assistant Examiner—Walter E. Snow
Attorney, Agent, or Firm—Edward D. Murphy; Walter Ottesen; Harold Weinstein

[57] ABSTRACT

A counterbalanced rotor is mounted on a rearward extension of the armature shaft of a portable electric tool. The rotor is nested within the annular portion of a ring member which is piloted on the rearward bridge portion of the motor field case. An end cap is secured to the field case and engages the annular portion of the ring, thereby retaining the ring against the bridge on the field case. The annular portion of the ring has an external boss with a notch formed therein substantially tangential to the annular portion. A printed circuit board is received in the notch and carries a semiconductor sensing device, such as a Hall-Effect generator, for cooperation with a magnet carried by the rotor. A spider member is retained in the bridge and has a bearing nested therein for journaling the commutator end of the armature shaft. The spider has a number of openings formed therein. The end cap has a plurality of ventilating openings formed therein, and a fan carried by the armature shaft draws cooling air in through the openings in the end cap. The cooling air is confined by the annular portion of the ring, is subjected to a turbulence by the rotor therein, and flows through the openings in the spider for purposes of cooling the bearing.

8 Claims, 14 Drawing Figures

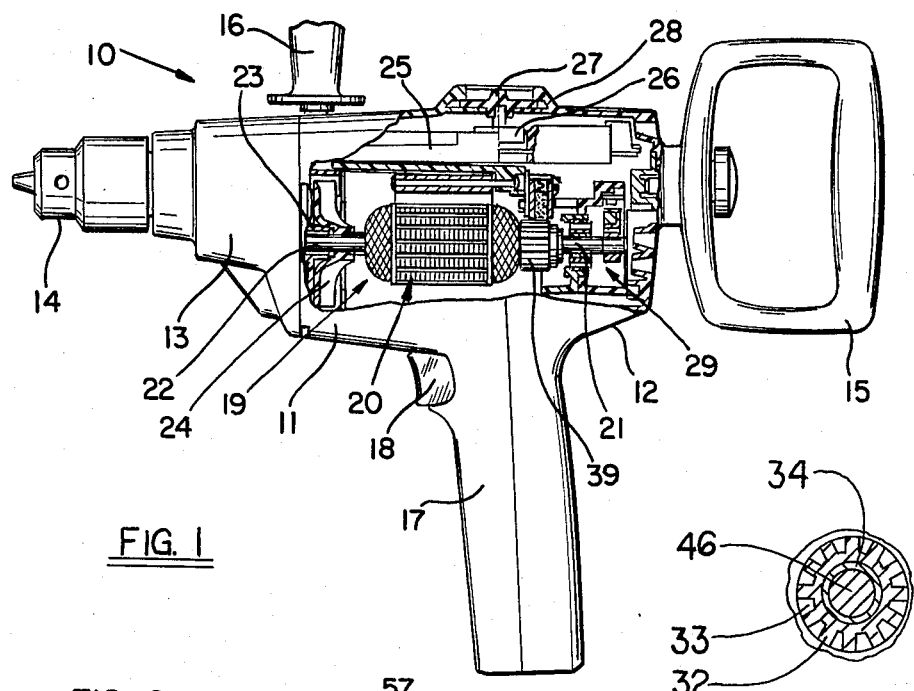
FIG. 1
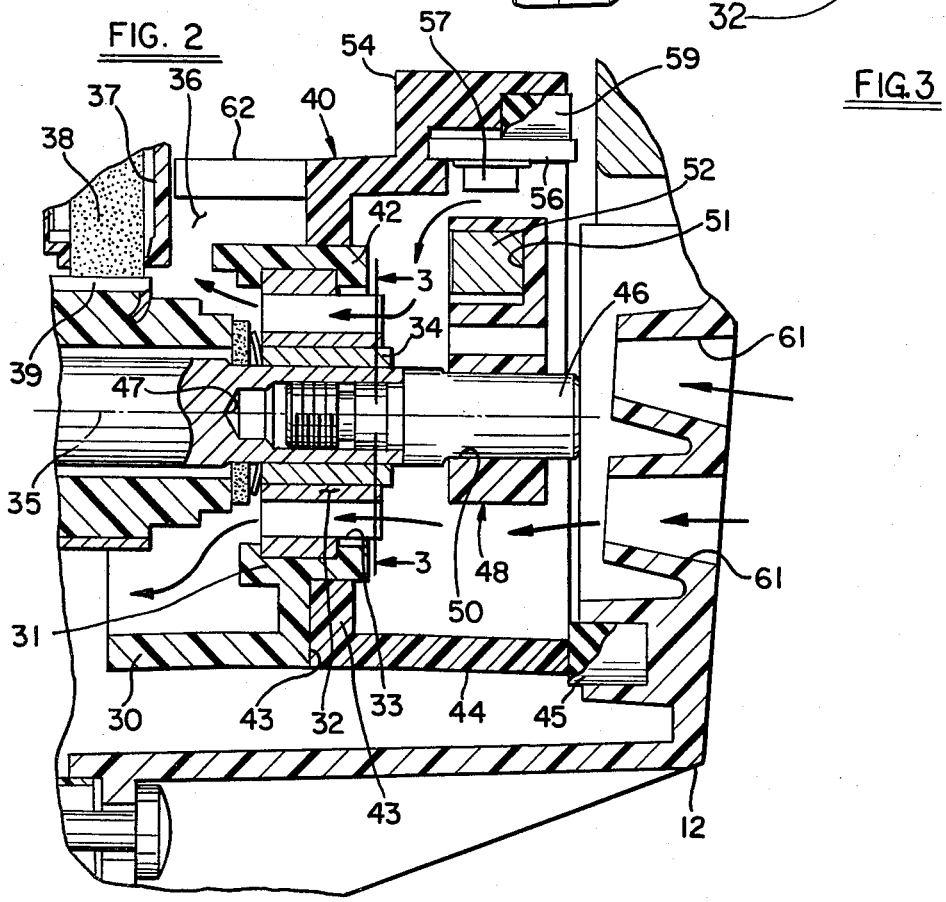
FIG. 2
FIG. 3

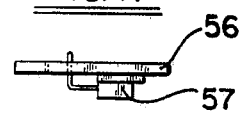
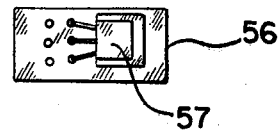
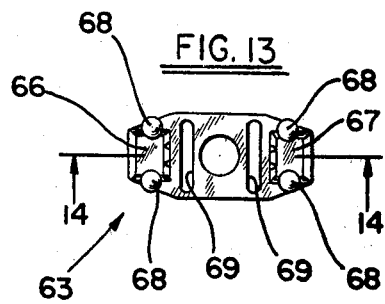
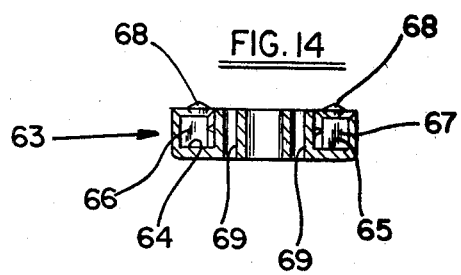

MOUNTING OF SEMICONDUCTOR SENSING MEANS FOR AN ELECTROMAGNETIC TACHOMETER IN A PORTABLE ELECTRIC TOOL

CROSS-REFERENCE

This application is a continuation-in-part of Application Ser. No. 116,259, filed Jan. 28, 1980, and now abandoned.

BACKGROUND OF THE INVENTION

In the general art of electric motor control systems, it is well known to derive a feedback signal from the rotating shaft to control a function or operating parameter of the motor. For example, the control system may be intended for speed control; or for electronic or so-called "brushless" commutation; or in the case of a stepping motor, position sensing and control. In order to obtain the desired feedback signal, a signal generating or pick-up sensing means is usually employed. For example, the sensing means may comprise a permanent magnet carried by the shaft and cooperating with one or more semiconductor sensing devices, such as a Hall-Effect generator, fixed with respect to the circular orbit of the rotating magnet. The magnet triggers the Hall-Effect generator to obtain the desired feedback signal, and the signal in turn is fed to suitable electronic circuitry for purposes of controlling a desired function of the motor. In the prior art, of which I am aware, various structural arrangements have been proposed for mounting the semiconductor sensing devices and their cooperating magnets in a variety of applications.

However, none of those structural arrangements are satisfactory for use in high-volume mass-produced portable electric tools intended for consumer as well as professional usage. In this environment, there are a number of unique conditions or criteria to be satisfied, such as size, weight, portability, convenience of usage, and reliability. Portable electric tools have been continually improved for increased power, miniaturization, double-insulation, and cost reduction. As a result, the motor, bearings, and other components are highly-loaded and require proper cooling; and thus the sensing means must not interfere with the flow of cooling air. Moreover, power tools are subject to vibratory forces in usage, especially in the case of a hammer-drill, and to maintain reliable operation the sensing means must be properly mounted to withstand these adverse vibratory forces. The requirements of double insulation (or "D.I.") must also be adherred to, again without interference from the sensing means. Finally, in the very competitive atmosphere of the power tool business, ease of assembly and economy of manufacture are important considerations.

SUMMARY OF THE INVENTION

Accordingly, it is an object of the present invention to provide a mounting means for a semiconductor sensing means in a portable electric tool, wherein the size, weight, portability, convenience of usage, and reliability of the tool are maintained.

It is another object to provide a mounting means for a semiconductor sensing means which is simple, reliable in its operation, and capable of withstanding relatively-high adverse vibratory forces within a power tool.

It is yet another object of the present invention to provide a mounting means which will enhance, rather than interfere with, the proper flow of cooling air for the motor, bearings and other components of the power tool.

It is a further object of the present invention to provide a mounting means which will tend to preserve certain D.I. requirements of the tool.

It is a still further object of the present invention to provide a mounting means, wherein the radial tolerances of its components may be closely controlled for proper triggering of the semiconductor device, and wherein the relatively large axial tolerances of the tool (referred to in the art as axial tolerance "stack up") are rendered inconsequential insofar as the sensing means is concerned.

It is a yet still further object of the present invention to provide a mounting means, wherein a maximum number of functions are performed by a minimum number of parts, thereby decreasing assembly time and reducing overall manufacturing costs.

In accordance with one aspect of the teachings of the present invention, the portable electric tool includes a field case having a rearward bridge portion provided with a bearing for journaling an armature shaft therein. A ring member is piloted on the bridge and has an annular portion extending rearwardly therefrom. A counter-balanced rotor is mounted on the armature shaft, rearwardly of the bridge, and is nested within the annular portion of the ring. A permanent magnet is carried by the rotor and cooperates with a semiconductor sensing device mounted on the ring. An end cap is secured to the field case and has a portion engaging the annular portion of the ring, thereby securing the ring against the bridge on the field case. A fan carried by the armature shaft draws cooling air in through ventilating openings in the end cap. The majority of the cooling air is confined by the annular portion of the ring, experiences a turbulence created by the rotor, and is arranged to flow into the field case to cool the bearing and other components of the motor.

In accordance with the further teachings of the present invention, the annular portion of the ring has an external boss with a notch formed therein substantially tangential to the annular portion. A printed circuit board is received in the notch and is resiliently loaded, thereby alleviating vibratory forces, and the semiconductor sensing device is mounted on the board.

These and other objects will become apparent from a reading of the following specification, taken in conjunction with the enclosed drawings.

BRIEF DESCRIPTION OF THE DRAWINGS

FIG. 1 is a side elevation of a portable electric tool within which the teachings of the present invention may find more particular utility, parts being broken away and sectioned to show certain components of the motor and the overall mounting means for the semiconductor sensing means;

FIG. 2 is an enlarged longitudinal section of a portion of FIG. 1, showing a preferred embodiment of the mounting means;

FIG. 3 is a section view, taken along the lines 3—3 of FIG. 2, showing the armature shaft journaled in a bearing nested within a spider member retained in the rearward bridge portion of the motor field case;

FIG. 11 is a side elevation of the printed circuit board and semiconductor device;

FIG. 12 is a top plan view thereof;

FIG. 13 is a top plan view of an alternate embodiment of the rotor, showing a pair of magnets mounted in respective recesses therein; and FIG. 14 is a section view, taken across the lines 14—14 of FIG. 13.

DESCRIPTION OF THE PREFERRED EMBODIMENT

Figure 4:
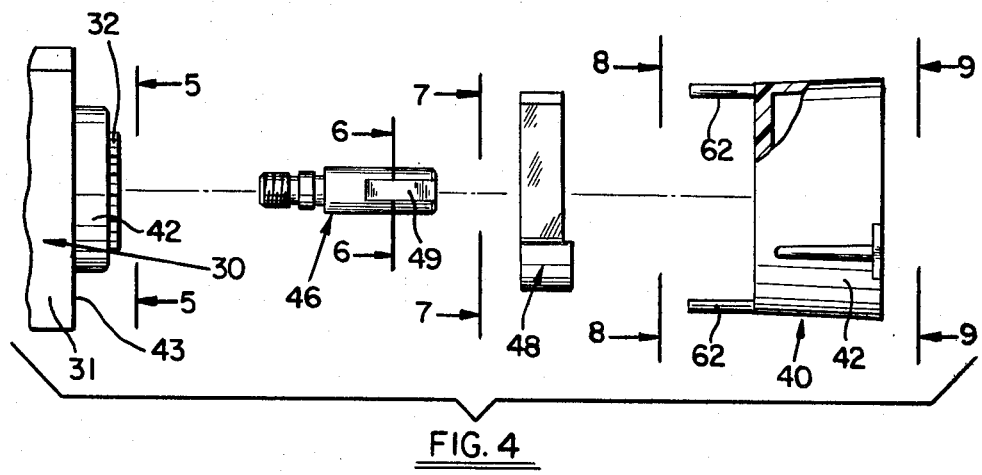
FIG. 4 is an exploded elevation showing a portion of the bridge, an extension shaft secured to the armature shaft and projecting rearwardly therefrom, a rotor carried by the extension shaft (the rotor being displaced 180 degrees from its position shown in FIG. 2), and a ring member piloted on the bridge of the field case and enclosing the rotor.
Figure 6:
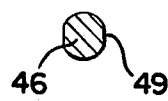
FIG. 6 is a section view, taken along the lines 6—6 of FIG. 4, and showing the flat surfaces formed on the extension shaft for keying the rotor thereto.
Figure 5:
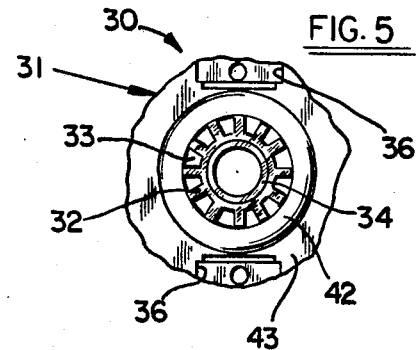
FIG. 5 is a view, taken along the lines 5—5 of FIG. 4, showing (in plan view) the spider member, the annular portion of the bridge for piloting the ring, the adjacent flat surface of the bridge, and a pair of diametrically-opposed longitudinal slots formed in the bridge for receiving respective brushholders therein.

With reference to FIG. 1, there is illustrated a portable electric drill 10 with which the teachings of the present invention may find more particular utility. It will be appreciated by those skilled in the art that the teachings of the present invention are not confined to the particular drill 10, but rather are equally applicable to a wide variety of portable electric tools, appliances, and other products having similar design criteria and operating parameters.

With this in mind, the drill 10 comprises a main motor housing 11, an end cap housing 12 secured rearwardly thereof, a gear case 13 secured forward thereof, a chuck 14 for retaining a drill bit (not shown), an end handle 15 secured rearwardly of the end cap housing, and an auxiliary handle 16. The motor housing and end cap housing are joined together along a common vertical plane and have respective depending portions joined together to form a pistol-grip handle 17. The pistol grip handle encloses a main switch (not shown) which is controlled by means of a trigger 18 projecting forwardly of the pistol-grip handle. The motor housing forms a compartment for a motor, designated generally as at 19. The motor includes a field case (not shown for ease of illustration) and further includes an armature 20 having a shaft 21. The armature shaft has a forward portion 22 journaled in a first bearing 23 retained in the gear case. A fan 24 is mounted on the armature shaft adjacent to the bearing, for cooling purposes. Preferably, the motor housing, end cap housing, and end handle are molded from a suitable plastic material.

In the preferred embodiment, the speed of the drill is maintained by electronic circuit means, including a microprocessor 25, housed above the motor. The microprocessor cooperates with a speed-selecting switch 26; and the switch is connected to a manually-operable selector knob 27, which is recessed within a boss 28 formed between the cooperating housings. The electronic circuit means is responsive to a feedback signal which is a function of the speed of rotation of the armature shaft. This feedback signal is generated by a tachometer or tacho-generator, generally designated at 29, which comprises the semiconductor sensing means. The wired connections between the tacho-generator and the microprocessor, as well as the particular electronic circuitry, form no part of the present invention and hence have been omitted for ease of illustration. Moreover, it will be appreciated by those skilled in the art, that the teachings of the present invention are not confined to the conjoint use of a tacho-generator in an electronic speed-control system for a portable electric tool; but rather, are equally applicable to other control systems as well as other products, wherein a semiconductor sensing device is required to perform reliably in a compact housing having highly-loaded components closely confined therein.

With reference to FIG. 2, and with further reference to FIGS. 4–10, the motor housing includes a field case 30 which is preferably molded from a suitable plastic material. The field case has an integrally-formed rearward bridge portion 31. The bridge has a spider member 32 integrally molded therein (forming a heat sink) and the spider has a toothed periphery defining a number of circumferentially-spaced openings 33, as shown more clearly in FIG. 5. A sleeve bearing 34 is nested concentrically within the spider, and press-fitted therein, for journaling the rearward portion 35 of the armature shaft. As shown more clearly in FIG. 5, a pair of diametrically-opposed longitudinal slots 36 are formed in the bridge of the field case, and respective brushholders (one of which is shown as at 37) are retained in the slots. The brushholders have brushes (one of which is shown as at 38) for engaging a commutator 39 mounted on the armature shaft. The bridge of the field case, as well as the brushholders, have been shown in a vertical orientation for ease of illustration; however, it will be appreciated by those skilled in the art that, if desired, the brushholders (and the brushes therein) could be circumferentially displaced or offset from the vertical axis.

Figure 8:
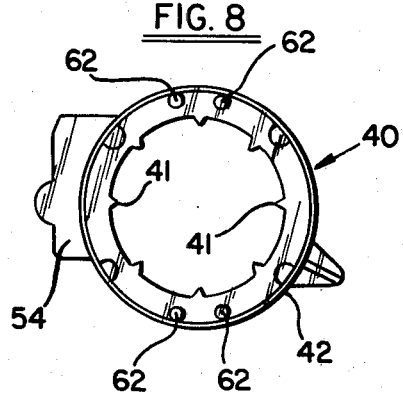
FIG. 8 is a view, taken along the lines 8—8 of FIG. 4, showing the crushable projections on the inner periphery of the ring, the projections cooperating with the annular portion of the bridge for thereby piloting the ring on the field case.
Figure 7:
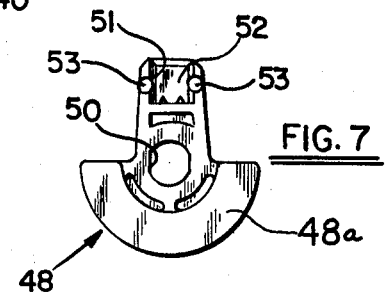
FIG. 7 is a view, taken along the lines 7—7 of FIG. 4, showing the counterbalanced rotor, and further showing the means for retaining a permanent magnet therein.

With particular reference to FIGS. 2, 4 and 8, a ring member 40 (which is preferably molded from a suitable plastic material) has an inner circumference provided with a series of circumferentially-spaced crushable projections 41, which engage a rearwardly-projecting annular portion 42 (shown in FIGS. 4 and 5) formed on the bridge of the field case. The ring is thus piloted on the annular portion of the bridge and is retained thereon, flush against the adjacent flat surface 43 of the bridge as shown in FIG. 2. The ring has a rearwardly-extending annular portion 44; and the end cap carries a pair of rubber plugs (one of which is shown as at 45 in FIG. 2) for engaging the annular portion of the ring. As a result, the ring may be quickly and easily assembled within the housing and is rigidly retained therein, between the end cap and the bridge of the field case.

With reference again to FIGS. 2, 4, 6 and 7, an extension shaft 46 is threadably received within a blind axial bore 47 formed in the rearward portion of the armature shaft. The extension shaft projects rearwardly of the bridge, and a counterbalanced rotor 48 is mounted thereon. The rotor, which is preferably molded from a suitable plastic material, is nested within the annular portion of the ring. The shaft has a pair of parallel flats 49 (shown in FIG. 6) for cooperation with an internal keyway 50 formed in the rotor (shown in FIG. 7) thereby coupling the rotor to the shaft. The rotor has a recess 51 formed therein for receiving a permanent magnet 52. A pair of studs 53 are integrally formed in the rotor, one on each side of the recess. When the magnet is received in the recess, the studs are deformed to thereby retain the magnet in its recess in the rotor. The rotor also has an enlarged counterbalance portion 48a to preclude any undesired dynamic unbalance.

Figure 9:
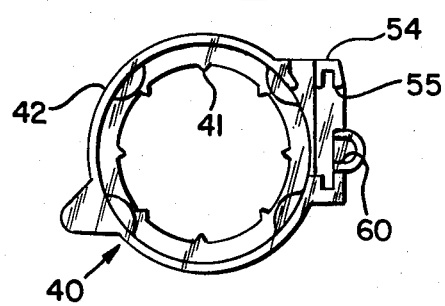
FIG. 9 is a view, taken along the lines 9—9 of FIG. 4, showing the external boss on the annular portion of the ring, the boss having a notch formed therein substantially tangential to the annular portion of the ring.
Figure 10:
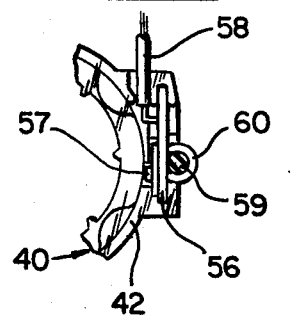
FIG. 10 corresponds to a portion of FIG. 9, but shows a printed circuit board received in the notch, the board carrying a semiconductor sensing device.

With further reference to FIGS. 9-12, the annular portion of the ring has an external boss 54, and the boss has a rectangular notch 55 formed therein substantially tangential to the annular portion of the ring (as shown in FIG. 9). A printed circuit board 56 (shown in FIGS. 11 and 12) is received within the notch (as shown in FIG. 10) and carries a semiconductor sensing device 57. The sensing device may comprise a Hall-Effect generator which is responsive to the presence of a magnetic field. The sensing device thereby cooperates with the permanent magnet carried by the rotor and generates a series of control signals dependent upon the motor speed (as understood by those skilled in the art) for input to the electronic speed-control means. Moreover, as shown more clearly in FIG. 10, the printed circuit board has a number of connecting wires, one of which is shown as at 58; and because of the tangentially-displaced position of the board, the wires are confined by the annular portion of the ring, thereby precluding the wires from becoming entangled with the rotor or armature shaft. Moreover, a rubber plug 59 is received within a cylindrical recess 60 formed in the boss and communicating with the notch therein. The plug bears against the printed circuit board, thereby resiliently loading the board and alleviating any adverse vibratory forces experienced during operation of the tool.

With reference again to FIG. 2, the end cap has a plurality of slotted openings 61 formed therein. The fan 24 draws cooling air in through the openings in the end cap, as shown by the small arrows. The majority of the cooling air is confined by the annular portion of the ring, experiences a turbulence due to the rotation of the rotor within the annular portion, and flows through the circumferentially-spaced openings in the spider for purposes of cooling the bearing for the rearward portion of the armature shaft. Thereafter, the cooling air continues through the motor compartment.

The ring is also provided with two pairs of prongs 62 formed integrally therewith. The prongs extend forwardly of the tool, within the respective slots 36 in the bridge portion of the field case, and terminate just short of the brushholders 37 as shown in FIG. 2. As a result, the prongs maintain the proper electrical spacing, should the brushholders ever become loose, thereby assisting in maintaining the requirements of double insulation.

With reference to FIGS. 13 and 14, an alternate embodiment of the rotor is shown, as at 63. The rotor 63 is preferably molded from a suitable plastic material and has a pair of recesses 64 and 65 for receiving permanent magnets 66 and 67, respectively. The magnets are retained in the recesses by means of deformed studs, as at 68, which are similar to the studs 53 on the rotor 48 of the FIG. 2 embodiment. The rotor 63 is thus counterbalanced, and respective through slots 69 are formed therein for reducing its weight.

With the present invention, the semiconductor sensing means and its mounting means achieve the objectives of simplicity, low cost, ease of assembly, rigidity, and reliability of operation. As a result, the present invention is ideally suited for application to a portable electric tool having an electronic speed-control or other control system. A maximum number of functions are achieved with a minimum number of components. Moreover, with the use of precision molded-plastic parts, the radial tolerances may be economically-controlled to close limits; and conversely, the axial tolerances or axial "stack up", which are relatively large and usually difficult to control economically, are relatively inconsequential and do not interfere with the proper triggering of the Hall-Effect generator under the periodic influence of the rotating magnet.

Obviously, many modifications may be made without departing from the basic spirit of the present invention. Accordingly, it will be appreciated by those skilled in the art that within the scope of the appended claims, the invention may be practiced other than has been specifically described herein.

I claim:
1. In a portable electric tool, the combination of:
   a field case having a rearward bridge with means therein for journaling one end of an armature shaft,
   a ring member coaxially engaging the bridge and having an annular portion extending rearwardly therefrom,
   a sensing device carried by the annular portion of the ring,
   a rotor carried by the armature shaft rearwardly of the bridge and nested within the annular portion of the ring,
   a permanent magnet carried by the rotor for cooperation with the sensing device, and
   an end cap secured to the field case, the end cap having at least one resilient member engaging the annular portion of the ring, thereby retaining the ring in firm engagement with the bridge of the field case.

2. In a portable electric tool, the combination of:
   a field case,
   an armature having a shaft journaled in first and second spaced bearings retained in the field case,
   a fan carried by the armature shaft adjacent the first bearing,
   a spider member disposed radially between the second bearing and the field case, the spider having a plurality of openings therein,
   a rotor carried by the armature shaft rearwardly of the spider member,
   a permanent magnet carried by the rotor,
   a ring member retained coaxially on the field case and having an annular portion disposed radially of the rotor,
   a sensing device carried by the annular portion of the ring member and cooperating with the magnet, and
   an end cap secured to the field case and engaging the annular portion of the ring member for retaining the ring member on the field case, the end cap having ventilating openings therein whereby the fan draws cooling air in through the openings of the end cap, the cooling air being confined by the ring member and experiencing a turbulence created by the rotor, and whereby the cooling air is drawn through the plurality of openings in the spider member to cool the second bearing.

3. In a portable electric tool, the combination of:
a field case having an armature shaft journaled therein, the field case being provided with a rearward bridge having a flat rearward face with an annular portion extending rearwardly therefrom,
a ring member coaxially positioned on the annular portion of the bridge and disposed flush against the face of the bridge, the ring member having an annular portion extending rearwardly therefrom,
an end cap secured to the field case and engaging the annular portion of the ring member, thereby retaining the ring member on the annular portion of the bridge and against the face of the bridge,
a rotor carried by the armature shaft rearwardly of the bridge and being nested within the annular portion of the ring member,
a permanent magnet carried by the rotor,
a boss formed integrally on an outer surface of the ring member, and
a sensing device mounted in the boss for cooperation with the magnet carried by the rotor.

4. In a portable electric tool, the combination of:
a field case having an armature shaft journaled therein, the field case further having a rearward bridge with diametrically-opposed longitudinal slots formed therein,
a plurality of brushholders mounted in the slots,
a ring member retained coaxially on the bridge and having an annular portion extending rearwardly of the bridge,
a sensing device carried by the annular portion of the ring member,
a rotor carried by the armature shaft rearwardly of the bridge and nested within the annular portion of the ring member,
a permanent magnet carried by the rotor for cooperation with the sensing device,
means for retaining the ring member in engagement with the bridge, and
prong means carried by the ring member and extending therefrom within the slots in the bridge and forwardly towards the brushholders.

5. In a portable electric tool, the combination of:
a field case having a rearward bridge,
a ring member carried by the bridge, the ring member having an annular portion extending rearwardly therefrom,
an armature shaft journaled in the bridge,
a rotor carried by the armature shaft rearwardly of the bridge and being nested within the annular portion of the ring member,
a permanent magnet carried by the rotor,
a boss formed integrally on an outer surface of the ring member, the boss having a notch formed therein substantially tangential to the annular portion of the ring member,
a printed circuit board received in the notch, and
a semiconductor sensing device mounted on the board for cooperation with the magnet carried by the rotor.

6. In a portable electric tool, the combination of:
a field case having an armature shaft journaled therein,
an extension shaft secured to the armature shaft and projecting rearwardly therefrom,
a counterbalanced rotor carried by the extension shaft,
a permanent magnet carried by the rotor,
an annular ring member retained in the tool radially of the rotor,
an external boss formed on an outer surface of the ring member, the boss having a notch formed therein substantially tangential to the ring member,
a printed circuit board in the notch, and
a semiconductor sensing device mounted on the board for cooperation with the magnet carried by the rotor.

7. In a portable electric tool, the combination of:
a molded plastic ring member retained in the tool, the ring member having an annular portion,
an external boss provided on the annular portion of the ring member, the boss having a notch formed therein substantially tangential to the annular portion of the ring member,
a printed circuit board received in the notch,
a semiconductor sensing device mounted on the board,
an armature shaft journaled in the tool,
a molded plastic counterbalanced rotor carried by the shaft and nested within the annular portion of the ring member, the rotor having at least one recess formed therein,
a permanent magnet seated in the recess, and
a pair of studs formed integrally on the rotor, one on each side of the recess, the studs being deformed over the magnet, thereby retaining the magnet in its recess in the rotor.

8. In a portable electric tool, the combination of:
a field case having a rearward bridge with diametrically-opposed longitudinally-extending slots formed therein, the bridge having a substantially flat rearward face and further having an annular portion extending rearwardly therefrom,
a plurality of brushholders positioned within the slots,
a spider coaxially nested within the rearward bridge and having a plurality of openings therein,
a bearing nested within the spider and retained therein,
an armature shaft having a rearward portion journaled in the bearing,
an extension shaft secured to the rearward portion of the armature shaft and extending rearwardly of the bridge,
a counterbalanced rotor carried by the extension shaft,
a permanent magnet carried by the rotor,
a ring member piloted on the annular portion of the bridge and disposed flush against the face of the bridge, the ring member having a rearwardly-extending annular portion enclosing the rotor,
prong means carried by the ring member, the prong means extending forwardly therefrom within the slots in the bridge and terminating short of the brushholders,
an external boss formed on the annular portion of the ring member, the boss having a notch formed therein substantially tangential to the annular portion, a printed circuit board received in the notch, a semiconductor sensing device carried by the board and cooperating with the magnet carried by the rotor, an end cap secured to the field case, the end cap engaging the annular portion of the ring member to retain the ring member against the face of the bridge and having ventilating openings formed therein, and a fan carried by the armature shaft, whereby the fan draws cooling air in through the openings in the end cap, the cooling air being confined within the annular portion of the ring and being subjected to a turbulence created by the rotor therein, and whereby the cooling air flows through the openings in the spider to cool the bearing for the armature shaft.

* * * * *